United States Patent [19]

Takahashi et al.

[11] Patent Number: 5,326,849

[45] Date of Patent: Jul. 5, 1994

[54] METHOD FOR PRODUCING AN AROMATIC POLY (THIO) ETHER KETONE

[75] Inventors: Yukio Takahashi, Kitami; Norihiko Yoneda, Sapporo; Seiichi Nozawa, Yamato, all of Japan

[73] Assignee: Mitsubishi Kasei Corporation, Tokyo, Japan

[21] Appl. No.: 136,731

[22] Filed: Oct. 14, 1993

Related U.S. Application Data

[63] Continuation of Ser. No. 787,793, Nov. 4, 1991, abandoned.

[30] Foreign Application Priority Data

Nov. 5, 1990 [JP] Japan .................................. 2-299253
Sep. 5, 1991 [JP] Japan .................................. 3-226242

[51] Int. Cl.$^5$ .............................................. C08G 63/06
[52] U.S. Cl. .................................. 528/207; 528/225; 528/360; 528/364
[58] Field of Search ............... 528/207, 225, 360, 364

[56] References Cited

U.S. PATENT DOCUMENTS

| | | | |
|---|---|---|---|
| 3,953,400 | 4/1976 | Dahl | 528/207 |
| 4,361,693 | 11/1982 | Jansons | 528/207 |
| 4,398,020 | 8/1983 | Rose | 528/360 |
| 4,820,792 | 4/1989 | Towle | 528/207 |

FOREIGN PATENT DOCUMENTS 1062325  3/1989  Japan .................................. 528/207

*Primary Examiner*—John C. Bleutge
*Assistant Examiner*—Helen F. Lee
*Attorney, Agent, or Firm*—Oblon, Spivak, McClelland, Maier & Neustadt

[57] ABSTRACT

A method for producing an aromatic poly(thio)ether ketone having repeating units of the following formula (II):

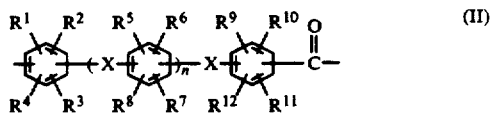

wherein each of $R^1$ to $R^{12}$ is a hydrogen atom, a halogen atom, a hydrocarbon group or an alkoxy group, X is an oxygen atom or a sulfur atom, provided that part of X may be a direct bond, and n is an integer of from 0 to 2, which comprises reacting an aromatic (thio)ether carboxylic acid fluoride of the following formula (I):

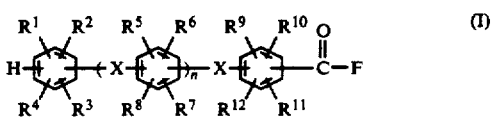

wherein $R^1$ to $R^{12}$, X and n are as defined above, under pressure in an aprotic organic solvent in the presence of boron trifluoride.

9 Claims, No Drawings

METHOD FOR PRODUCING AN AROMATIC POLY (THIO) ETHER KETONE

This application is a continuation of application Ser. No. 07/787,793, filed on Nov. 4, 1991, now abandoned.

BACKGROUND OF THE INVENTION

1. Field of the Invention

The present invention relates to a method for producing a linear crystalline thermoplastic aromatic poly(thio)ether ketone having a high degree of polymerization.

2. Discussion of Background

Aromatic poly(thio)ether ketones having a structure of the following formula (II):

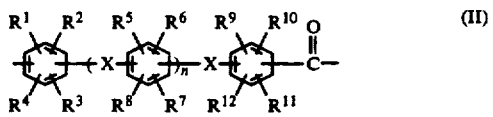

wherein each of $R^1$ to $R^{12}$ is a hydrogen atom, a halogen atom, a hydrocarbon group or an alkoxy group, X is an oxygen atom or a sulfur atom, provided that part of X may be a direct bond, and n is an integer of from 0 to 2, particularly aromatic poly(thio)ether ketones having structures of the following formulas (III) and (IV), have high melting points [(III): Tm=365° C.; (IV): Tm=334° C.] and high glass transition points [(III): Tg=154° C.; (IV): Tg=144° C.], and they are known to be polymers which are excellent in the heat resistance, mechanical properties, electrical properties and dimensional stability and which have low water absorption and excellent physical properties. Further, they are insoluble in solvents other than concentrated sulfuric acid and thus are polymers excellent also in the chemical resistance.

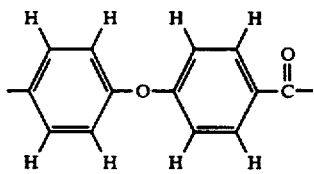

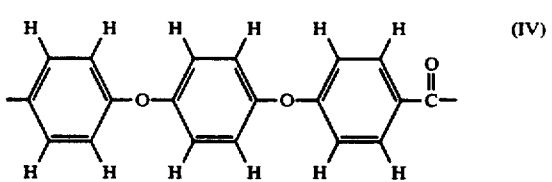

Heretofore, as a method for producing these polymers, a method of reacting 4,4'-difluorobenzophenone with 4,4'-dihydroxybenzophenone or with an alkali metal salt of dihydroquinone in diphenylsulfone (Japanese Unexamined Patent Publications No. 90296/1979 and No. 89334/1980) or a method of conducting self-condensation of an alkali metal salt of 4-fluoro-4'-hydroxybenzophenone in diphenylsulfone (Japanese Unexamined Patent Publication No. 16946/1985), has been known. However, such a method has many drawbacks such that the reaction temperature is required to be at least 300° C., and 4,4'-difluorobenzophenone or 4-fluoro-4'-hydroxybenzophenone is expensive.

As other methods, a method of reacting 4-phenoxybenzoyl chloride in a hydrogen fluoride solvent in the presence of boron trifluoride (Japanese Examined Patent Publication No. 451/1981) and a method of reacting diphenyl ether and a S-alkyl-thiochloroformate in a hydrogen fluoride solvent in the presence of boron trifluoride (Japanese Unexamined Patent Publication No. 171181/1983) are known. However, each of these methods has many drawbacks, such that a highly corrosive solvent like hydrogen fluoride is employed.

As a method for producing aromatic polyether ketones of the formula (III), etc., a method of polymerizing 4-phenoxybenzoyl chloride or 4,4'-diphenyl ether dicarboxylic acid dichloride with diphenyl ether in 1,2-dichloroethane in the presence of anhydrous aluminum trichloride, is also known (M. I. Litter and C. S. Marvell, J. Polym. Sci; Polychen Ed. 23, 2205-2223 (1985)). However, this method requires a large amount, i.e. more than equivalent, of aluminum chloride, and it is thereby difficult to recover aluminum chloride thus used, whereby a large amount of the aluminum compound will have to be disposed by post treatment. Thus, this method is not suitable for application as an industrial process.

Under these circumstances, the present inventors have conducted extensive researches and, as a result, have found it possible to obtain a polymer having a high degree of polymerization by polymerizing an acid fluoride of the following formula (I) under pressure in the presence of a non-corrosive aprotic organic solvent without using a corrosive solvent such as hydrogen fluoride and by using boron trifluoride which can be recycled, instead of the aluminum chloride. The present invention has been accomplished on the basis of this discovery.

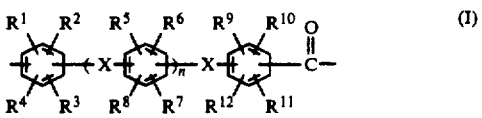

wherein each of $R^1$ to $R^{12}$ is a hydrogen atom, a halogen atom, a hydrocarbon group or an alkoxy group, X is an oxygen atom or a sulfur atom, provided that part of X may be a direct bond, and n is an integer of from 0 to 2.

Thus, the present invention provides a method for producing an aromatic poly(thio)ether ketone having repeating units of the following formula (II):

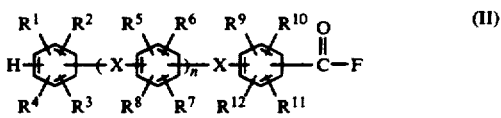

wherein $R^1$ to $R^{12}$, X and n are as defined above, which comprises reacting an aromatic (thio)ether carboxylic acid fluoride of the above formula (I) under pressure in an aprotic organic solvent in the presence of boron trifluoride.

Now, the present invention will be described in detail.

Specific examples of the aromatic (thio)ether carboxylic acid fluoride of the above formula (I) to be used in the present invention, include 4-phenoxybenzoyl fluoride, 4-phenoxy-4'-fluoroformyldiphenyl ether, 3-phenoxybenzoyl fluoride, 4-phenyl-4'-fluoroformyldiphenyl thioether, 3-methyl-4-phenoxybenzoyl fluoride, 3-methoxy-4-phenoxybenzoyl fluoride and 4- phenylmercaptobenzoyl fluoride. However, any one represented by the formula (I) can be used, and the compound of the formula (I) is not limited to the above specific examples. These aromatic (thio)ether carboxylic acid fluorides may be used alone or in combination as a mixture. Among them, 4-phenoxybenzoyl fluoride is particularly preferred.

The aprotic organic solvent to be used as a solvent in the present invention may, for example, be a hydrocarbon, a halogenated hydrocarbon, an aliphatic ether, a ketone, a compound having a nitro group, or other compounds. Specific examples include methylene chloride, dichloroethane, 1,1,2,2-tetrachloroethane, chloroform, carbon tetrachloride, nitrobenzene, nitromethane, carbon disulfide, o-dibromobenzene, o-dichlorobenzene, m-dichlorobenzene, diphenylsulfone, diphenylketone, chlorobenzene, benzene, toluene, acetophenone, tetralin, decalin, hexane, dibutyl ether, heptane and pentane. However, the aprotic organic solvent is not limited to such specific examples. Among these solvents, a halogenated hydrocarbon is preferred. More preferred is a halogenated aromatic hydrocarbon. Particularly preferred is o-dichlorobenzene. These aprotic solvents may be used alone or in combination as a mixture.

The solvent is used in an amount of from 1 to 100 parts by weight, preferably from 5 to 100 parts by weight, per part by weight of the organic (thio)ether carboxylic acid fluoride of the formula (I).

The boron trifluoride for the present invention is used in an amount of from 0.5 to 100 parts by weight, preferably from 0.9 to 50 parts by weight, per part by weight of the aromatic (thio)ether carboxylic acid fluoride of the formula (I).

There is no particular restriction as to the reaction temperature in the present invention. However, it is usual to conduct the reaction at a temperature of from −10° to 200° C., preferably from 30° to 150° C. There is no particular restriction as to the reaction pressure, but the reaction is usually conducted under pressure. Preferably, the pressure is at least 5 atm.

According to the present invention, a linear poly(thio)ether ketone having a high degree of polymerization can be obtained in good yield.

The aromatic polyketone obtained by the present invention has many merits. Namely, it is excellent in the mechanical properties such as the tensile strength, flexural strength and tensile modulus of elasticity, the heat resistance, the thermal decomposition initiation temperature, the electrical properties and the dimensional stability and has a low moisture and water absorptivity.

Now, the present invention will be described in further detail with reference to Examples. However, it should be understood that the present invention is by no means restricted to such specific Examples.

EXAMPLE 1

Into a 100 ml autoclave made of Hastelloy C (tradename), 2.16 g (10 mmol) of 4-phenoxybenzoyl fluoride and 20 ml of o-dichlorobenzene were charged, and boron trifluoride was added at room temperature to a pressure of 20 atm. Then, the temperature was raised to 100° C., and the reaction was conducted under stirring for 26.5 hours. After completion of the reaction, the reaction mixture was cooled to 0° C., and unreacted boron trifluoride was purged. Then, 30 cc of absolute methanol was injected. A precipitated solid was washed once with 100 cc of methanol and once with 100 cc of hot methanol to obtain a polymer as a slightly red powder.

The yield was 91%, and $\eta_{inh}$ was 1.02 dl/g, as measured at 30° C. with respect to a solution having the polymer dissolved in 97% sulfuric acid at a concentration of 1 g/l. Further, as a result of the DSC measurement, a sharp melting point was observed at 367° C. Further, the H-NMR measurement was conducted with a $CDCl_3$-$CF_3CO_2D$ (1:1) solvent, whereby the following (a) was detected in doublet at 7.25 ppm and the following (b) was detected in doublet at 7.95 ppm, and thus it was confirmed that a polymer of the following (c) was formed.

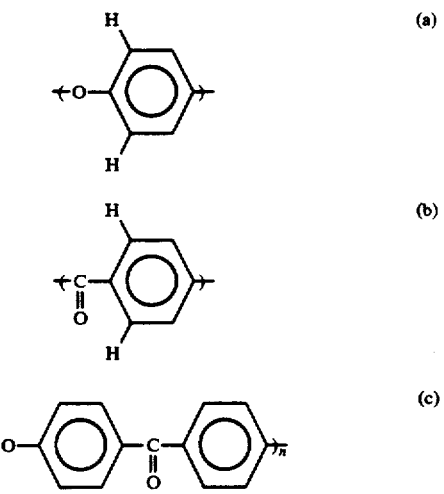

EXAMPLE 2

Into a 100 ml autoclave made of Hastelloy C (tradename), 1.96 g (10 mmol) of 4-phenoxybenzoyl fluoride and 20 ml of o-dichlorobenzene were charged, and boron trifluoride was added at room temperature to a pressure of 20 atm. Then, the temperature was raised to 60° C., and the reaction was conducted under stirring for 33 hours. After completion of the reaction, the reaction mixture was cooled to 0° C. and unreacted boron trifluoride was purged. Then, 30 cc of absolute methanol was injected. A precipitated solid was washed once with 100 cc of methanol and once with 100 cc of hot methanol to obtain a polymer as a slightly red powder.

The yield was 84%, and $\eta_{inh}$ was 0.52 dl/g, as measured at 30° C. with respect to a solution having the polymer dissolved in 97% sulfuric acid at a concentration of 1 g/l. Further, as a result of the DSC measurement, a sharp melting point was observed at 367° C. Further, from the H-NMR measurement, formation of the desired polymer was confirmed.

COMPARATIVE EXAMPLE 1

Polymerization was conducted under the same conditions as in Example 1 except that $BF_3$ was supplied at 60° C. at 1 atm at a rate of 20 l/min, whereby $\eta_{inh}$ was 0.007 dl/g, and the yield was 64%.

What is claimed is:

1. A method for producing an aromatic polyether ketone having repeating units of the following formula (II):

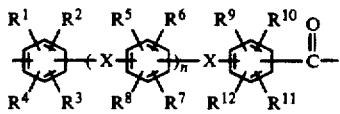

wherein each of $R^1$ to $R^{12}$ is a hydrogen atom, a halogen atom, a hydrocarbon group or an alkoxy group, X is an oxygen atom, provided that part of X may be a direct bond, and n is an integer of from 0 to 2, which consisting of reacting an aromatic ether carboxylic acid fluoride of the following formula (I):

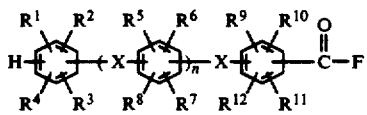

wherein $R^1$ to $R^{12}$, X and n are as defined above, under pressure of at least 5 atms in an aprotic organic solvent in the presence of boron trifluoride.

2. The method according to claim 1, wherein the aromatic ether carboxylic acid fluoride of the formula (I) is at least one member selected from the group consisting of 4-phenoxybenzoyl fluoride, 4-phenoxy-4'-fluoroformyldiphenyl ether, 3-phenoxybenzoyl fluoride, 3-methyl-4-phenoxybenzoyl fluoride, 3-methoxy-4-phenoxybenzoyl fluoride and 4-phenylmercaptobenzoyl fluoride.

3. The method according to claim 1, wherein the aromatic ether carboxylic acid fluoride of the formula (I) is 4-phenoxybenzoyl fluoride.

4. The method according to claim 1, wherein the aprotic organic solvent is at least one member selected from the group consisting of methylene chloride, dichloroethane, 1,1,2,2-tetrachloroethane, chloroform, carbon tetrachloride, nitrobenzene, nitromethane, carbon disulfide, o-dibromobenzene, o-dichlorobenzene, m-dichlorobenzene, diphenylsulfone, diphenyl ketone, chlorobenzene, benzene, toluene, acetophenone, tetralin, decalin, hexane, dibutyl ether, heptane and pentane.

5. The method according to claim 1, wherein the aprotic organic solvent is chlorinated aromatic hydrocarbon.

6. The method according to claim 1, wherein the aprotic organic solvent is o-dichlorobenzene.

7. The method according to claim 1, wherein the solvent is used in an amount of from 1 to 100 parts by weight per part by weight of the organic ether carboxylic acid fluoride.

8. The method according to claim 1, wherein the boron trifluoride is used in an amount of from 0.5 to 100 parts by weight per part by weight of the aromatic ether carboxylic acid fluoride.

9. The method according to claim 1, wherein the reaction is conducted at a temperature of from −10° to +200° C.

* * * * *